Figure 1:
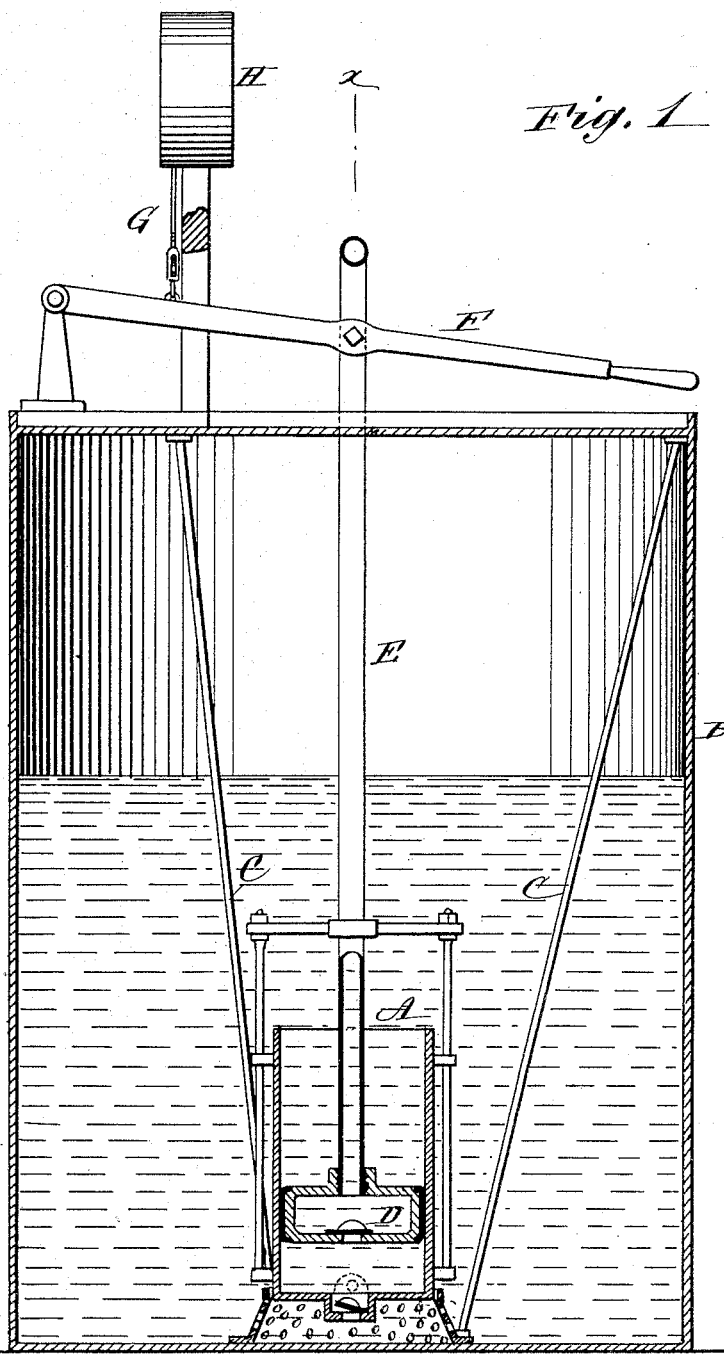

(No Model.)

W. B. F. SIMS.
MEASURING PUMP.

No. 351,538. Patented Oct. 26, 1886.

WITNESSES:
C. Neveux
C. Sedgwick

INVENTOR:
W. B. F. Sims
BY Munn & Co
ATTORNEYS.

(No Model.) 2 Sheets—Sheet 2.
W. B. F. SIMS.
MEASURING PUMP.
No. 351,538. Patented Oct. 26, 1886.
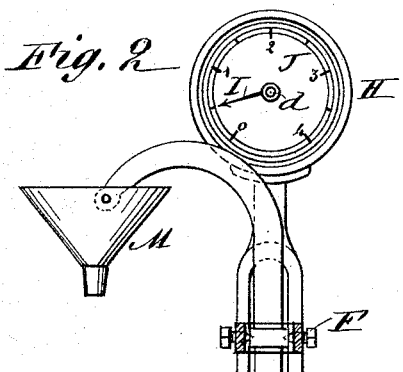
Fig. 2.
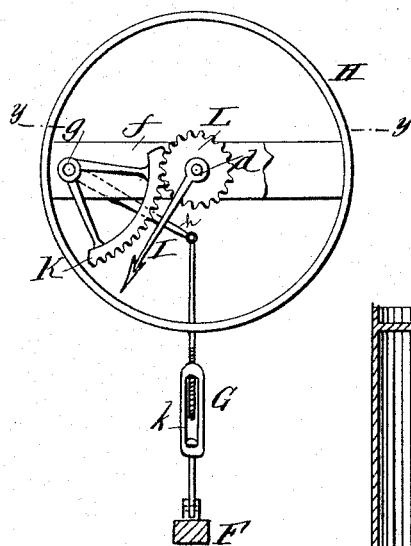
Fig. 3.
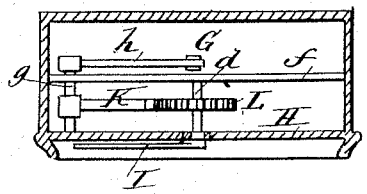
Fig. 4.
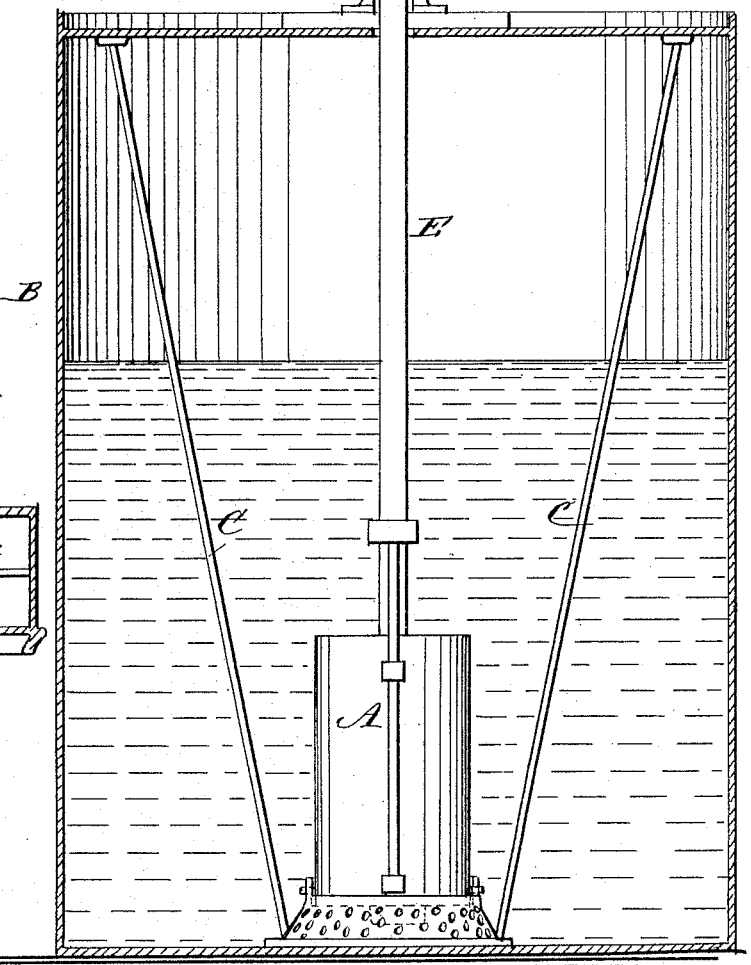
WITNESSES:
C. Neveux
C. Sedgwick
INVENTOR:
W. B. F. Sims
BY Munn & Co.
ATTORNEYS.

UNITED STATES PATENT OFFICE.

WILLIAM B. F. SIMS, OF CORYDON, INDIANA.

MEASURING-PUMP.

SPECIFICATION forming part of Letters Patent No. 351,538, dated October 26, 1886.

Application filed April 19, 1886. Serial No. 199,287. (No model.)

*To all whom it may concern:*

Be it known that I, WILLIAM B. F. SIMS, of Corydon, in the county of Harrison and State of Indiana, have invented a new and Improved Combined Pump and Measure, of which the following is a full, clear, and exact description.

My invention consists of the construction, arrangement, and combination of parts, all as hereinafter described and claimed.

Reference is to be had to the accompanying drawings, forming a part of this specification, in which similar letters of reference indicate corresponding parts in all the figures.

Figure 1 is a sectional elevation showing my invention applied to a tank for oil or other liquid. Fig. 2 is a similar view taken on the line $x\,x$ of Fig. 1. Fig. 3 is a detail view of the registering mechanism, the graduated face being removed; and Fig. 4 is a sectional plan view taken on the line $y\,y$, Fig. 3.

The pump A is of the usual or may be of any approved construction, secured in the tank B by the braces C C. The pump shown is provided with a hollow piston-head, D, and tube E, which is connected to the pump-lever F for operating the pump. To the lever F is connected, by the connecting-rod G, the measuring device or register H, so the movement of the lever up and down will move the pointer I in front of the graduated dial J a distance bearing a certain ratio to the distance of movement of the lever. The dial is graduated in pints, quarts, gallons, &c., according to the flow or capacity of the pump. The movement of the lever is communicated to the pointer preferably by means of the pivoted segmental rack K and pinion L, the latter secured upon the shaft $d$, to the outer end of which the pointer is secured. The shaft $d$ is journaled at one end in the dial H, and at the other in the cross-piece $f$, as shown in Fig. 4, and the pivot $g$, to which the rack K is secured, is also journaled in the dial and said cross-pieces, as shown in said Fig. 4, and to one end of the pivot $g$ is secured the arm $h$, to which the connecting-rod G, above mentioned, is secured, as shown in Fig. 3, so the movement of the pump-lever will, through the said connecting-rod G, arm $h$, rack K, and pinion L, cause the pointer to turn. The connecting-rod G may be adjusted as to length by the turn-buckle $k$ fitted therein. To the upper curved end of the pipe E is attached the funnel M, for directing the flow of liquid into any receptacle.

In use, to draw any desired quantity of liquid the lever F will be raised until the pointer I indicates the desired quantity upon the dial; then the lever is simply to be forced downward, which will cause the exact quantity to be forced out of the pump.

Having thus fully described my invention, what I claim as new, and desire to secure by Letters Patent, is—

1. The combination, with the registering device comprising the dial-faced case inclosing a shaft carrying a pointer or index and a pinion geared to a pivoted segment, of the pump piston or head, the tube connected to said piston or head, and the handle connected to said tube and to the registering device, substantially as set forth.

2. The combination, with the registering device comprising the dial-faced case inclosing a shaft carrying a pointer or index and a pinion geared to a pivoted segment, of the pump piston or head, the tube connected to said piston or head, the handle connected to said tube, the connecting-rod attached to the said handle, and the arm connected to said connecting-rod and to the shaft or axis of the said segment, substantially as and for the purpose set forth.

WILLIAM B. F. SIMS.

Witnesses:
PHILIP B. HAYS,
H. C. HAYS.